United States Patent Office 3,412,961
Patented Nov. 26, 1968

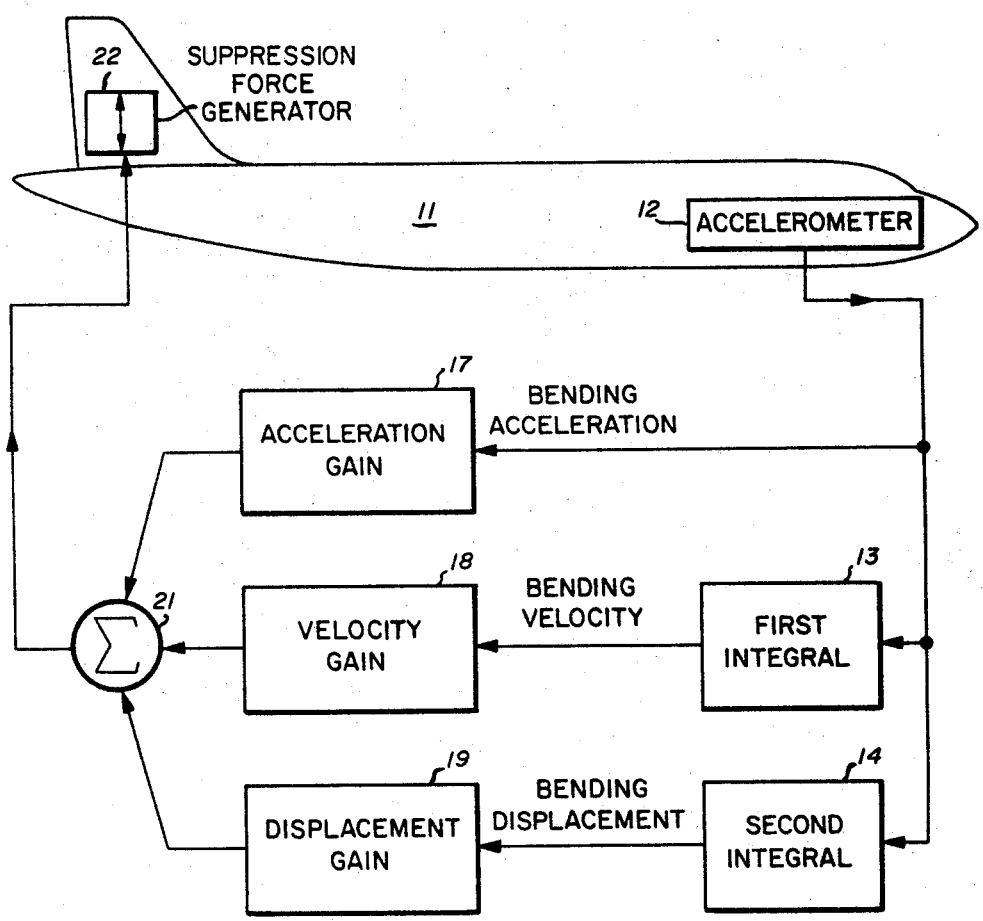
Fig_1

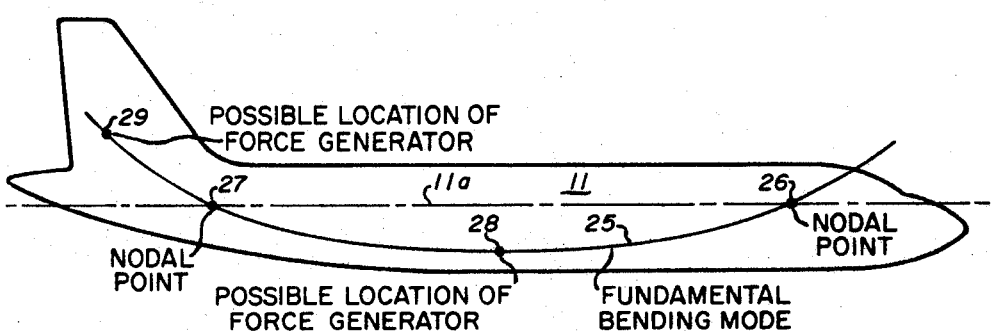
Fig_2
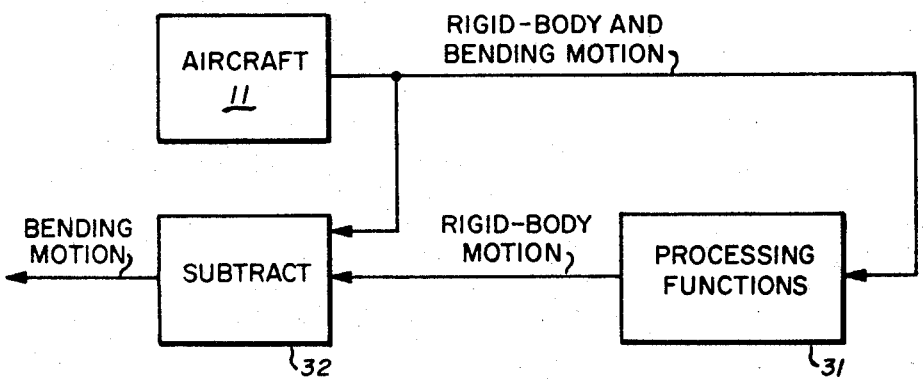
Fig_3

3,412,961
MEANS FOR SUPPRESSING OR ATTENUATING BENDING MOTION OF ELASTIC BODIES
James C. Howard, Sunnyvale, Calif., assignor to the United States of America as represented by the Administrator of the National Aeronautics and Space Administration
Filed July 27, 1966, Ser. No. 568,355
4 Claims. (Cl. 244—77)

ABSTRACT OF THE DISCLOSURE

A system for attenuating or suppressing bending motion in an elastic body in which signals proportional to the bending acceleration, velocity and displacement of the body are utilized to control the generation of forces which are applied to the body to modify its effective bending mass, damping and stiffness, to thereby modify its vibration characteristics. Rigid-body motion components are eliminated from the signals so that the bending signals are uncontaminated.

---

The invention described herein was made by an employee of the United States Government and may be manufactured and used by or for the Government for governmental purposes without the payment of any royalties thereon or therefor.

This invention relates in general to the attenuation or suppression of bending motion in elastic bodies, and relates more particularly to systems for automatically and continuously providing such attenuation or suppression.

The problem of undesirable bending motion in elastic bodies occurs in a number of situations, and is of particular concern in large aircraft, space vehicle boosters and the like. This bending motion occurs as a result of the fact that large bodies, such as aircraft frames or space vehicles, are not completely rigid and hence behave as elastic beams. The bending motion which results is undesirable for a number of reasons. In the case of passenger-carrying aircraft, the bending motion can result in vibration and noise which is annoying to the passengers and crew. In case of space vehicle boosters and the like, the bending motion produces undesired components in the motion signals supplied from sensors in the vehicle, and the presence of these components renders the manual or automatic control of the vehicle more difficult.

Numerous techniques have been suggested in the prior art for reducing vibration noise in aircraft, which is a problem related to the bending motion discussed here, but none of them have been completely satisfactory. One approach suggested in the art involves the use of a plurality of electric vibrators located at different points in the aircraft frame. These vibrators apply force to the aircraft frame at points which vibration detectors indicate may vibrate in the critical destructive range, the force applied by the vibrators produces a resultant vibration which is outside the critical destructive range. This type of system has the disadvantage that it involves treating individual areas of vibration in the aircraft, thus requiring as many detectors and vibrators as there are areas in which critical vibration may occur.

In accordance with this invention, there is provided a system which treats the bending motion of the elastic body as a whole and applies a corrective force to the body to attenuate or suppress the undesired bending motion. The bending motion is detected by a suitable sensor, such as an accelerometer, disposed in the elastic body. The output of the accelerometer is a function of the bending acceleration of the body at the sensor location, and by also providing the first and second integrals of this acceleration, signals proportional to bending velocity and displacement of motion of the body are obtained. These signals, which are respectively proportional to bending acceleration, velocity and displacement, are modified by suitable gains in a feedback loop and are then utilized to generate suppression or attenuation forces which are applied to the elastic body to suppress or attenuate the undesired bending motion. The component of the suppression force proportional to the bending velocity operates on the body to modify its damping, and the component of suppression force which is proportional to the bending displacement has the effect of changing the generalized stiffness of the body, and hence its frequency of vibration.

The system of this invention is thus effective to modify the effective bending mass, damping, and stiffness of the body and hence modify its vibration characteristics so as to attenuate or suppress the undesired bending motion. If the motion of the body includes both rigid-body motion and bending motion, as is often the case with large, high speed aircraft and space vehicle boosters, it is necessary to separate the bending motion component from the total sensed motion of the elastic body in order to provide accurate control of the generation of the suppression forces. This separation of bending motion from rigid-body motion may be accomplished as taught in my copending application, Ser. No. 556,396, filed July 19, 1966, now U.S. Patent No. 3,374,966, in which the output signals from a plurality of sensors on the elastic body are modified by processing functions determined by the modal vibration characteristics of the body.

It is therefore an object of this invention to provide an improved system for attenuating or suppressing bending motion in an elastic body.

It is a further object of this invention to provide a system for attenuating or suppressing bending motion in an elastic body in which the modal motion of the body as a whole is attenuated or suppressed by a controlled suppression force generated in response to detection of characteristics of the motion of the body.

It is an additional object of the present invention to provide a system for attenuating or suppressing bending motion in an elastic body in which signals proportional to the bending acceleration, velocity and displacement of the body are utilized to control the generation of forces which are applied to the body to attenuate or suppress the modal motion of the body as a whole.

It is a further object of this invention to provide a system for attenuating or suppressing bending motion in an elastic body in which signals proportional to the bending acceleration, velocity and displacement of the body are utilized to control the generation of forces which are applied to the body to modify its effective bending mass, damping and stiffness, to thereby modify its vibration characteristics.

Objects and advantages other than those set forth above will be apparent from the following description, when read in connection with the accompanying drawings, in which:

FIGURE 1 is a schematic illustration, partly in block diagram form, of one embodiment of the invention applied to the control of bending motion in an aircraft;

FIGURE 2 illustrates some of the vibration characteristics of an aircraft of the type shown in FIGURE 1; and FIGURE 3 schematically illustrates the use of the technique of my above identified copending application in separating the bending motion component from the total motion of a flexible vehicle, for use in the present invention.

As shown in FIGURE 1, an aircraft 11 which is subject to undesired bending motion may be provided with an accelerometer 12 disposed therein at a suitable point for producing an output signal which is a measure of the bending acceleration of the aircraft at the measuring point.

The output from accelerometer 12 is supplied to an integrating network 13 which generates the first integral of the acceleration signal to produce an output signal which is a measure of the bending velocity of the aircraft. The accelerometer output signal is also supplied to a second integrating network 14 which generates the second integral of the acceleration signal to produce an output signal which is a measure of the bending displacement of the aircraft. Thus, there are provided from accelerometer 12 and integrating networks 13 and 14 signals proportional to the bending acceleration, bending velocity, and bending displacement, respectively.

These bending acceleration, bending velocity and bending displacement signals are supplied to associated controllable gain networks 17, 18 and 19, where the signals are modified in accordance with gain factors determined by the modal characteristics of the aircraft. That is, the bending acceleration signal from accelerometer 12 is modified in bending acceleration gain network 17 by a factor determined by the modal characteristics of the aircraft, and the bending velocity and bending displacement signals from integrators 13 and 14 are similarly modified by their associated gain networks 18 and 19 by factors determined by the modal characteristics of the aircraft.

The output signals from networks 17, 18 and 19 may be supplied to a summing device 21 where the signals are combined to produce an output signal which is utilized to control the generation of the suppression forces. This suppression force generator is indicated schematically at 22, and may be of any suitable type which is capable of applying the required suppression forces to the aircraft in response to the controlling signal from summing device 21. For example, in the case of jet aircraft, the necessary forces may be obtained from one or more of the aircraft's jet engines. As an alternative, compressed air may be suitably controlled so as to apply the required suppression forces to the aircraft.

In utilizing existing jet forces or auxiliary compressed air, force generator 22 would consist of a valve to control the jet flow or the release of compressed air and a hydraulic actuator to move the valve in response to command signals issuing from summing junction 21. Under these circumstances, the position of the valve would determine the magnitude of the forces generated.

In connection with the applying of the suppression forces, FIGURE 2 illustrates some of the vibration characteristics of an aircraft such as aircraft 11. Curve 25 of FIGURE 2 represents a fundamental bending mode of the aircraft along the axis 11a. The nodal points of this bending mode are represented by points 26 and 27. The forces from one or more suppression force generators 22 may be applied anywhere along curve 25, but to be effective the nodal regions of points 26 and 27 should be avoided. The force generators 22 may be located effectively at point 28, or at point 29, or at both of these points, to produce the desired attenuation or suppression of body motion.

The suppression forces applied to the aircraft will be joint functions of the bending acceleration, bending velocity and bending displacement signals supplied from gain networks 17, 18 and 19 to summing device 21. The suppression force component proportional to the bending acceleration has the effect of changing the generalized mass of the beam represented by aircraft 11, and hence modifies the frequency of vibration of the beam. The suppression force component proportional to the bending velocity operates on the aircraft to modify its damping and thus modify its vibration characteristics. The suppression force component proportional to the bending displacement has the effect of modifying the generalized stiffness of the beam to thus modify its frequency. Thus, each of the bending acceleration, bending velocity and bending displacement signals are effective in their own manner to modify the vibration characteristics of the beam to attenuate or suppress the undesired bending motion.

As a general rule, once the modal characteristics of the aircraft are known, the gain factors of the gain networks 17, 18, 19 are determined by the degree of attenuation required. In the above discussion, it was assumed that it was desired to utilize the acceleration, velocity and displacement signals in modifying the motion of the aircraft. However, in some instances, it may only be necessary to shift the frequency away from some critical range, in which case either the acceleration gain or the displacement gain would be adjusted to effect the desired change. If, in addition to changing the frequency of the bending motion, it is also desired to reduce the amplitude of the bending motion, the displacement gain may be adjusted to give the desired result.

In other applications, the bending frequency and the bending amplitude may be acceptable as they are, but it is desired to modify the structural damping so that once the bending motion is excited, it will die out quickly, rather than continue to oscillate for a large number of cycles. Under these circumstances, the velocity gain may be adjusted to provide the required damping. In this connection, it should be noted that aircraft and missile structures are very lightly damped, and often have low structural frequencies. For example, it is anticipated that the structural frequencies of supersonic transports will be of the order of one cycle, while some rockets may have even lower frequencies.

An additional consideration is that although it may be desirable or preferable to suppress, rather than merely attenuate the bending motion of the flexible body, in many situations the cost of complete suppression may not be justified so that attenuation alone is all that is required.

In the above description, it was assumed that accelerometer 12 was sensing only the bending motion of the aircraft, so that the accelerometer output was a true measure of the bending motion. However, if aircraft 11 is undergoing both bending motion and rigid-body motion, as would be the case with an aircraft which was accelerating, the output of accelerometer 12 will be a function of both the bending motion acceleration and rigid-body acceleration and it will be necessary to separate this bending motion component from the total sensed motion of the aircraft. As indicated above, one particularly effective technique for performing this separation is taught in my co-pending application, Ser. No. 556,396, filed July 19, 1966, now U.S. Patent No. 3,374,966. Briefly, this co-pending application employs a plurality of motion sensors whose outputs are operated on by processing functions determined from the modal characteristics of the structure. These processing functions are determined in advance, assuming a number ($n$) of modal slopes of significance, and ($n+1$) sensors are employed, one for each mode of motion to produce signals which are modified by the processing functions to separate the rigid-body motion from the bending motion.

This technique may be utilized as shown in FIGURE 3 to provide a signal which is a measure of the bending motion of the body. In FIGURE 3, aircraft 11 is shown functionally and is provided with the required sensors to produce output signals which have components of both rigid-body motion and bending motion. These sensor signals are supplied as inputs to processing function networks, represented diagramatically at 31, which modify the sensor signals to produce one or more output signals corresponding to rigid-body motion alone. This rigid-body motion signal is supplied to a subtraction network 32 where it is subtracted from the sensor outputs. Since the sensor outputs contain both rigid-body motion components and bending motion components, subtraction therefrom of the rigid-body motion components leaves only the bending motion component. Thus, the output of subtraction network 32 corresponds to the bending motion only, and may hence be utilized as described above in controlling the application of the suppression forces to the aircraft.

From the foregoing, it will be seen that there is provided an effective method of attenuating or suppressing the bending motion of an elastic body. This technique has been illustrated and described in connection with an aircraft, but it will be apparent that it is equally applicale to the control of bending motion in other elastic bodies, such as boosters for space vehicles, ships and possibly suspension and multi-span bridges. In the past, the bending characteristics of an elastic system were essentially fixed once the system was constructed. However, with the present invention, it will be apparent that these bending characteristics may be modified over a wide range to suit the desired or required needs of a particular situation.

What is claimed is:

1. Apparatus for attenuating or suppressing bending motion in an elastic body having both rigid-body motion and bending motion, comprising:
    means disposed in said body for generating a signal which is a function of the bending acceleration and the rigid-body acceleration of said body;
    means for eleminating the rigid-body motion components from said signal and producing a bending acceleration signal;
    means for generating a bending velocity signal which is a function of the bending velocity of said body;
    means for generating a bending displacement signal which is a function of the bending displacement of said body;
    means for modifying each of said bending acceleration, bending velocity and bending displacement signals by gain factors determined by the elastic characteristics of said body;
    summing means for combining said modified signals to produce a control signal;
    suppression force generating means for applying bending motion suppression forces to said body; and
    means for coupling said control signal to said force generating means, said applied suppression forces varying as a function of said bending acceleration signal, said bending velocity signal and said bending displacement signal.

2. Apparatus in accordance with claim 1 wherein said elastic body is a jet-engine propelled aircraft, said suppression force generating means comprises a controllable valve supplied with gases from said jet engine, and said valve is positioned at an antinode of said aircraft.

3. Apparatus for attenuating or suppressing bending motion in an elastic body having rigid-body motion, comprising:
    accelerometer means in said body for detecting rigid-body acceleration and bending acceleration of said body;
    means coupled to said accelerometer means for producing a signal which is a function of the rigid-body acceleration of said body;
    substraction means coupled to said accelerometer means and said signal producing means for generating a signal which is a function of said bending acceleration of said body;
    first integrating means coupled to said subtraction means for generating the first integral of said bending acceleration signal to produce a bending velocity signal;
    second integrating means coupled to said subtraction means for generating the second integral of said bending acceleration signal to produce a bending displacement signal;
    means for modifying each of said bending acceleration, bending velocity and bending displacement signals by gain factors determined by the elastic characteristics of said body;
    summing means for combining said modified signals to produce a control signal;
    suppression force generating means for applying bending motion suppression force to said body; and
    means for coupling said control signal to said force generating means, said applied suppression forces varying as a function of said bending acceleration signal, said bending velocity signal and said bending displacement signal.

4. Apparatus in accordance with claim 3 wherein said elastic body is a jet-engine propelled aircraft, said suppression force generating means comprises a controllable valve supplied with gases from said jet engine, and said valve is positioned at an antinode of said aircraft.

References Cited

UNITED STATES PATENTS

| 3,012,180 | 12/1961 | Finvold | 244—77 |
| 3,114,520 | 12/1963 | Finvold | 244—75 |
| 3,240,447 | 3/1966 | Olshausen | 244—77 |
| 3,253,808 | 5/1966 | La Fave | 244—75 |
| 3,279,725 | 10/1966 | Andrew et al. | 244—77 |
| 3,301,510 | 1/1967 | Cook | 244—77 |

FERGUS S. MIDDLETON, *Primary Examiner.*